United States Patent [19]

Akasaki

[11] Patent Number: 4,894,277
[45] Date of Patent: Jan. 16, 1990

[54] APPLICATION METHOD AND PRODUCTS THAT USE A FOAMED HOT MELT ADHESIVE

[75] Inventor: Toshiro Akasaki, Tokyo, Japan

[73] Assignee: Nordson Corporation, Westlake, Ohio

[21] Appl. No.: 926,132

[22] Filed: Nov. 3, 1986

Related U.S. Application Data

[63] Continuation-in-part of Ser. No. 818,815, Jan. 14, 1986, abandoned.

[30] Foreign Application Priority Data

Jan. 16, 1985 [JP] Japan ................................. 60-6501
Apr. 26, 1985 [JP] Japan ................................. 60-90167

[51] Int. Cl.⁴ ............................................. B32B 3/26
[52] U.S. Cl. ................................. 428/198; 156/79; 427/373; 427/421; 428/286; 428/316.6; 428/317.1; 428/317.5; 428/317.9; 428/905
[58] Field of Search ................. 428/198, 316.6, 317.1, 428/317.3, 317.5, 317.7, 905, 286, 317.9; 427/373, 421; 156/79

[56] References Cited

U.S. PATENT DOCUMENTS

| | | | |
|---|---|---|---|
| 3,152,923 | 10/1964 | Marshall et al. | 118/685 |
| 3,567,119 | 3/1971 | Wilbert et al. | 428/905 |
| 4,059,714 | 11/1977 | Scholl et al. | 428/317.5 |
| 4,247,581 | 1/1981 | Cobbs et al. | 427/373 |
| 4,256,526 | 3/1981 | McDaniel | 428/317.5 |
| 4,429,001 | 1/1984 | Kolpin et al. | 428/283 |
| 4,549,915 | 10/1985 | Ritschel et al. | 428/317.5 |

FOREIGN PATENT DOCUMENTS

| | | |
|---|---|---|
| 0173179 | 3/1986 | European Pat. Off. . |
| 3225844 | 1/1984 | Fed. Rep. of Germany . |
| 2924174 | 4/1984 | Fed. Rep. of Germany ...... 428/198 |

Primary Examiner—William J. Van Balen
Attorney, Agent, or Firm—Wood, Herron & Evans

[57] ABSTRACT

A method that includes the step of spraying a foamed hot melt adhesive from the discharge nozzle of a spray gun under such conditions that elongated strands of foamed hot melt adhesive are formed in an open weave film of spider web configuration which is deposited on a first substrate. A second substrate can then be bonded to the first to form a product. Alternatively, and before the second substrate is bonded to the first, a powder, e.g., a hygroscopic powder, can be deposited within the open areas of the film's spider web configuration to form a laminate product with a special enhanced characteristic, e.g., moisture absorbency.

9 Claims, 4 Drawing Sheets

APPLICATION METHOD AND PRODUCTS THAT USE A FOAMED HOT MELT ADHESIVE

RELATED CASES

This is a continuation-in-part of U.S. patent application Ser. No. 818,815, filed Jan. 14, 1986, now abandoned, and entitled "Application Method and Products That Use A Foamed Hot Melt Adhesive", which is assigned to the assignee of this invention.

BACKGROUND OF THE INVENTION

This invention pertains to a method of applying a hot melt adhesive foam, and to products manufactured by this method.

Historically, a roll coater or extruder has been used to apply a hot melt adhesive to the surface of a substrate. And it is also known to spray a hot melt adhesive on the surface of a substrate. The main constituent of a hot melt adhesive is usually a thermoplastic resin. However, a hot melt adhesive can also include plasticizers, stabilizers, and adhesive resins as additives in small quantities, as necessary. But unlike coating materials, a hot melt adhesive includes no diluent. Therefore, the viscosity of a hot melt adhesive is comparatively high, and its coagulating power is also strong.

When a hot melt adhesive is sprayed the sprayed particles are comparatively large. Specifically, the diameter range of the hot melt adhesive spray particles can vary widely, e.g., between 50 and 5,000 microns even at a viscosity of 1000 cps, which is comparatively low for a hot melt adhesive. The fact that the spray particles are so large and vary so widely in size leads not only to waste of adhesive material in the manufacturing process, but also to low-quality products as a result of weak or nonuniform adhesion. In the case of foils and films, the surface of the foil or film may become rough when it is bonded to a substrate through use of a sprayed hot melt adhesive, thereby resulting in the loss of an attractive appearance. Further, the hardened hot melt adhesive is rough to the touch. For these reasons, the spraying of hot melt adhesives has been adopted only in special areas.

The present invention pertains to a method for applying a foam of hot melt adhesive by the use of an air spray, and to products manufactured by this method that incorporate the hot melt adhesive foam as a bonding agent. The invention, which makes efficient use of the properties of foamable hot melt adhesives, is aimed at solving the defects of the products to which hot melt adhesives have been applied by conventional spraying methods. In the invention, a hot melt adhesive foam is applied to the surface of a first substrate by means of hot air spraying. Importantly, the spray conditions are regulated such that an adhesive film of generally spider web type configuration, i.e., an open weave or open mesh film with significant gaps or openings throughout its surface area, is formed on the first substrate. A second substrate can then be bonded to the first to form a laminate product. Alternatively, and before the second substrate is bonded to the first, a powder, e.g., a hygroscopic powder, can be deposited within the open mesh areas of the adhesive film's spider web configuration in order to form a laminate product with a special enhanced characteristic, e.g., moisture absorbency.

The foamed hot melt adhesive method of this invention not only retains its primary property of adhesivity but also provides the following merits in the adhesion process: a reduction in the amount of adhesive material used as a result of a decrease in specific gravity; a lowered apparent viscosity under high pressure in the applicator; a decreased fluidity after application; a thinner adhesion layer and an expanded adhesion area after adhesion of the substrates under pressure; a shortened set time; improved adhesion when used on porous or rough surfaces; a reduced surface heat capacity which prevents surface heat deformation when applied to thin sheets and other materials; an increase in the feasibility of low temperature applications because of the relative rapid cooling of the substrate surface; improved sealability; improved softness and touch for the finished laminate product; light weight; increased open time in the manufacturing process; and reduced total cost.

Further advantages of the invention will be more apparent from the following description in connection with the figures in which.

Figure 1:
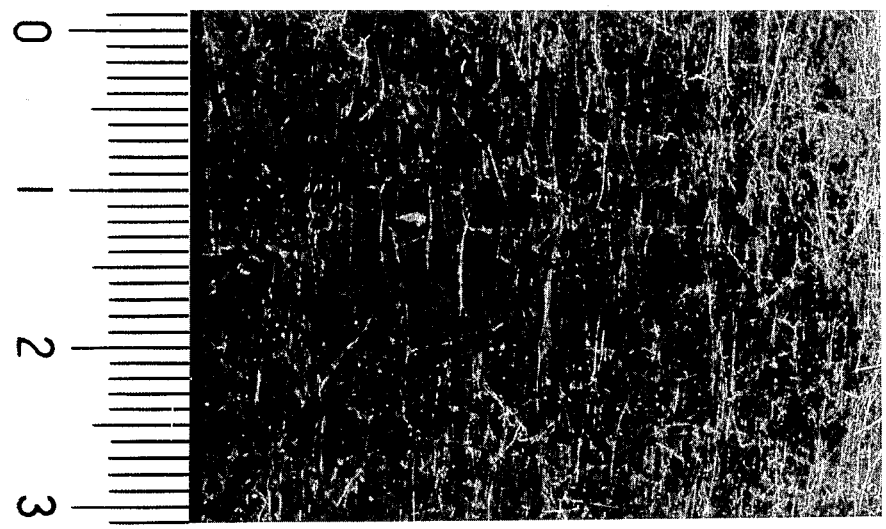
FIG. 1 shows a plan view of the generally spider web type hot melt adhesive film produced by the method of the invention.

The method of this invention is an improvement of the method disclosed in Cobbs et al U.S. Pat. No. 4,247,581, assigned to Nordson Corporation, Amherst, Ohio, the assignee of this application, the disclosure of that patent being incorporated by reference in its entirety herein. As disclosed in U.S. Pat. No. 4,247,581, hot melt adhesive in the form of a thermoplastic resin of comparatively high viscosity is first heated and melted in a hot melt applicator. A gas is mixed into the hot melt adhesive, and then pressure is applied to maintain the gas in solution within the liquid hot melt adhesive. Suitable thermoplastic resins include non-vulcanized rubber-based thermoplastic resins, EVA, polyolefin-based thermoplastic resins, copolymerized polyolefin-based thermoplastic resins, and modified polyolefin-based thermoplastic resins. Nitrogen, carbon dioxide and other gases in the form of innumerable air bubbles are suitable for mixing with the above-mentioned various thermoplastic resins after they have been melted.

The pressurized adhesive is then transmitted through a pressure-resistant, heat-resistant hose, and is air-sprayed from the discharge outlet of a fluid tip or nozzle that includes an air cap at the end of the nozzle. When released into the atmosphere through the discharge outlet of the nozzle, the thermoplastic resin expands and is atomized. In addition, the melt pressure comes down from about 800 psi (56 kg/cm$^2$) to atmospheric pressure. At that time, the very small bubbles of compressed gas in solution in the liquid hot melt adhesive swell about 50 times, or, in other words, they explode. As a result, the resin volume increases 1.5 to 10 times. The spray which is thus produced, and which can be deposited on a substrate as a thin film, does not consist of large cohesive particles, like conventional hot melt adhesives. Instead, the spray consists of very small particles or droplets of foamed adhesive formed by atomization of the liquid/gas solution by the hot air ejected from the nozzle.

In accordance with the method disclosed in U.S. Pat. No. 4,247,581, the size of the particles formed in the course of atomizing the adhesive/gas solution as it is ejected from the nozzle is controlled by a number of parameters. One set of parameters is the flow rate and temperature of the atomizing air which impacts the liquid/gas solution as it exits the nozzle to break up the solution into a stream of very small foamed particles. In the event a particular shape or pattern of the stream ejected from the nozzle is desired, pattern air is ejected from the air cap onto the stream of atomized, foamed particles. The flow rate and temperature of this pattern air is also important in controlling the ultimate size of the foamed particles. The temperatures and flow rates of both the atomizing air and pattern-shaping air are controlled separately. These temperatures vary depending upon the hot melt foam employed, but typically range between about 100° C. and 500° C.

A principle feature of this invention is the elimination of the very small particles or droplets of foam formed by atomization of the liquid hot melt adhesive/gas solution as it is ejected from the discharge outlet of the nozzle. In this invention, the liquid hot melt adhesive/gas solution is formed into elongated strands of foamed adhesive upon ejection from the discharge orifice of the nozzle. The elongated strands then string together in a spider web like configuration when deposited upon a substrate to form an adhesive film on that substrate which resembles an open weave mesh having spaces in between the elongated strands.

In the preferred embodiment herein, several parameters are controlled to avoid atomization of the liquid/gas solution into minute particles or droplets and instead form the foamed adhesive in elongated strands. These parameters include the flow rate of the liquid/gas solution through the discharge outlet of the nozzle, the temperature and flow rate of a stream of heated discharge air which impacts the liquid/gas solution as it exits the nozzle, and, where applicable, the temperature and flow rate of the pattern-shaping air ejected by the air cap downstream from the discharge outlet of the nozzle.

As a result of the adjustment of these nozzle parameters, elongated strands of foamed hot melt adhesive are formed which join together in a spider web like configuration on a substrate forming an even, thin film in the shape of an open weave mesh. This is obtained even on uneven surfaces of non-woven fiber substrates like glass wool. The spaces between the elongated strands of foamed adhesive forming the open mesh or weave configuration are varied by adjusting the nozzle parameters discussed above. The proper selection of the ejection or flow rates and temperatures makes it possible to obtain the optimum open weave film configuration for a particular application. Accordingly, the ejection rates and temperatures will vary in the practice of the method of this invention with the size and shape of the substrate, the speed at which the substrate passes beneath the applicator, the characteristics of the hot melt adhesive, the thickness of the open weave film desired and various other parameters.

Figure 2:
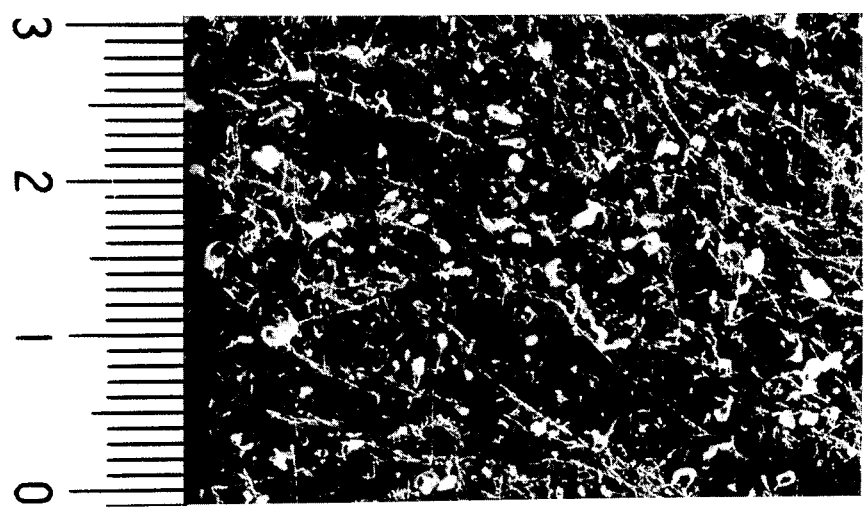
FIG. 2 shows a plan view of a spider web type film similar to that shown in FIG. 1, but with nodules thereon.

A specific apparatus set up with data on a specific hot melt adhesive, and which produces FIG. 1 and FIG. 2 spider web like films, is as follows:

|  | FIG. 1 spider web film | FIG. 2 spider web film |
| --- | --- | --- |
| foamed hot melt adhesive | Eastman product A-150 (1900 cps) | same as to the left |
| nozzle | Nordson product 245-227J | same as to the left |
| air cap | Nordson product 245-985J | same as to the left |
| liquid pressure | 56 kg/cm$^2$ | 56 kg/cm$^2$ |
| melting temperature | 190° C. | 190° C. |
| spray rates | | |
| (a) foamable hot melt adhesive | 0.8 g/m$^2$ | 10 g/m$^2$ |
| (b) ejection rate of discharge air | 90/min | 110/min |
| temperature of discharge air | 200° C. | 240° C. |
| (c) ejection rate of pattern air and | 110/min | 130/min |
| temperature of pattern air | 200° C. | 240° C. |
| substrate | sheet | same as to the left |
| line speed | 15.7 m/min | same as to the left |
| room temperature | 20° C. | 20° C. |
| humidity | 68% | 68% |

Figure 3:
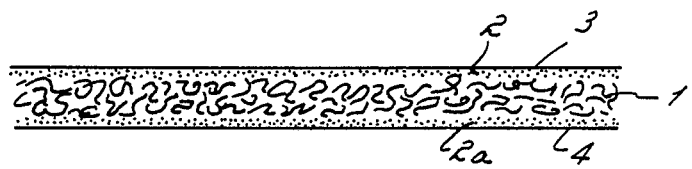
FIG. 3 shows a cross section of a heat insulating mat formed in accord with the invention, aluminum foil and plastic film being bonded to opposite sides of a glass wool mat.
Figure 4:
FIG. 4 shows a cross section of a laminate product in which cellophane and polypropylene sheets are bonded to one another.

FIGS. 3 and 4 illustrate two different products made in accordance with the invention.

FIG. 3 illustrates a heat-insulating mat having a non-woven fabric mat 1, e.g., of glass wool, that is lined on one side with aluminum foil 4 and the other side with plastic film 3. In bonding the aluminum foil 4 to the glass wool mat 1, it is normally impossible to apply a coating of hot melt adhesive to the glass wool mat's surface by standard methods because the short nonwoven fibers of the mat are irregularly scattered across that surface. And it would not be economical to apply the hot melt adhesive to the aluminum foil 4. The use of a hot melt adhesive foam sprayed onto the mat's surfaces in open weave films 2, 2a having spider web like configurations allows the glass wool mat to be easily bonded to the aluminum foil 4 and to the plastic film 3.

The most notable merit of the invention is the great reduction in material cost of the hot melt adhesive. The invention also offers the following merits in the manufacturing process: a longer open time within which to bond on the foil 4 and film 3 on the mat 1, a shorter set time to increase time efficiency, less sag, and no thermal deformation of the plastic film. The benefit to the finished product is a good appearance and, particularly, a smooth surface on the plastic film. The method invention can be applied not only to the above-mentioned heat-insulating mats 1, but also to disposable paper diapers for which fluffy materials and non-woven fabrics are used in place of glass wool. The surface of a diaper made according to the invention is soft to the touch.

Other laminated products such as laminated paper, plywood board, and other composites can be manufactured by this invention, too. These products are characterized by a reduction in material cost, by thinness and lightness, by lack of significant heat deformation, and by excellent flexibility and softness to the touch. FIG. 4 shows a cross section of such a product. The FIG. 4 product is comprised of a cellophane substrate or film 6 bonded to a polypropylene substrate or film 7 through use of an open weave hot melt adhesive film 5 with a spider web like configuration deposited in accord with the principles of this invention.

The present invention, in one preferred form, also pertains to a moisture-absorbing cloth, and to a method for producing such cloth. Although reference herein is made primarily to hygroscopic or moisture-absorbing agents, for purposes of describing this aspect of the invention the term active agent will be used, and that term will include hygroscopic agents, deodorizing agents, scent or fragrance releasing agents, and any other type agent that provides a desirable and result to the laminate within which it is captured.

Moisture-absorbing cloths have been manufactured for a long time. Recently, however, the demand for them is increasing for sanitary and deodorizing purposes. The method and end product of this invention is particularly suitable for making a commercially, viable product for that type end use. More specifically, the present invention permits the capture of the active agent, e.g., a moisture-absorbing agent, between layers of a laminate, and particularly between laminate layers that include a cloth for at least one layer, in such a way that a number of advantages are obtained. Specifically, the thickness of the laminate remains uniform, the appearance and touch of the laminate are improved, and the activity of usefulness of the active agent is not unduly impeded.

in this preferred form of the invention, and for example, at least two layers of non-woven cloth are bonded together by an open weave hot melt adhesive foam film applied as beforementioned in the spider web like configuration. Alternatively, one of the layers, usually an outer layer, may be comprised of a film (e.g., a plastic film) or a foil (e.g., a metal foil). Further, the active agent, i.e., at least one of the moisture-absorbing, deodorizing, or fragrance-enhancing agents, is scattered in powder form in the open spaces between the fibers of the open weave film structure created from the hot melt adhesive foam.

The step of applying active agents is carried out after the open weave film of hot melt adhesive foam has been laid down on the surface of one substrate, but before the second substrate has been bonded thereto. In other words, and for example, the hot melt adhesive foam is applied to the surface of one layer of non-woven cloth to form a spider web like structure on that surface, and then the necessary amount of active agent particles is scattered in the open spaces between the elongated strands of the open weave film before another layer of non-woven cloth is bonded to that first layer. Suitable hygroscopic agents which can be used to produce a moisture-absorbing cloth include a drying agent such as silica gel, aluminum or calcium chloride, etc. The particles of these agents should be comparatively small, however. One useful water-absorbing agent is FG 801 s-n available from Ni Hetsa Kogaku. Specific examples of moisture-absorbing cloths in accord with the principles of the invention, and the method of making same, are described below and are schematically illustrated in FIGS. 5–13.

Figure 5:
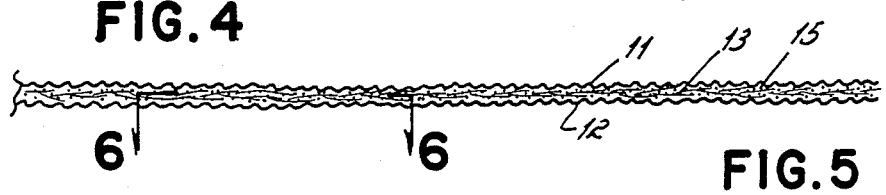
FIG. 5 is a cross section view showing a first embodiment of a moisture-absorbing cloth in accord with the principles of the invention.
Figure 6:
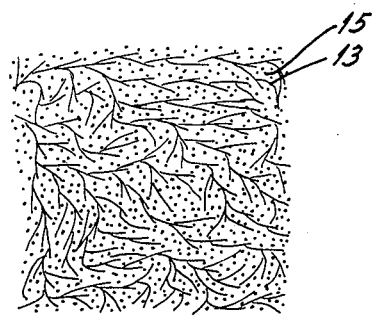
FIG. 6 is a transverse section view taken along line 6—6 of FIG. 5.

A first embodiment of a moisture-absorbing cloth is shown in FIGS. 5 and 6. Two sheets 11, 12 of non-woven cloth are bonded together by means of an open weave hot melt adhesive foam film 13 which is provided in the form of a spider web like configuration as earlier described. The hygroscopic agent particles 15 are scattered in the open spaces between the elongated strands of the open weave film 13. When the elongated strands of the open weave film 13 are widely spaced from one another, and the quantity of the hygroscopic agent is comparatively large, the moisture-absorbing capacity of the cloth is high, but the adhesion between the layers 11, 12 of non-woven cloth of the moisture-absorbing system is weak. Conversely, when the elongated strands of the open weave film 13 are densely packed and the quantity of hygroscopic agent particles is comparatively small, the moisture-absorbing capacity of the moisture-absorbing cloth is low, but the adhesion between the layers 11, 12 of non-woven cloth is strong. In the latter case, if the quantity of hygroscopic agent is increased, the exposed surfaces of the elongated strands forming the open weave film 13 become covered by the hygroscopic agent, and this decreases the adhesive power of the hot melt adhesive foam. Therefore, the ratio between the quantity of adhesive foam and the quantity of hygroscopic agent must be adjusted based on the use of the moisture-absorbing cloth, the quality of the non-woven cloth, and the type of hot melt adhesive foam.

Figure 7:
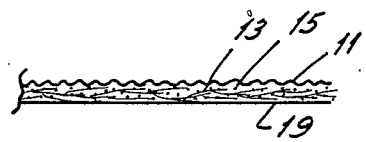
FIG. 7 is a cross section view of another example of a moisture-absorbing cloth similar to that shown in FIG. 5.

An alternative embodiment to the FIGS. 5 and 6 product is shown in FIG. 7. In FIG. 7, one substrate 11 is a non-woven cloth, and the other substrate 19 is a layer of woven cloth or a sheet of plastic. Otherwise, the FIG. 7 embodiment is the same as the FIGS. 5 and 6 embodiment.

Figure 14:
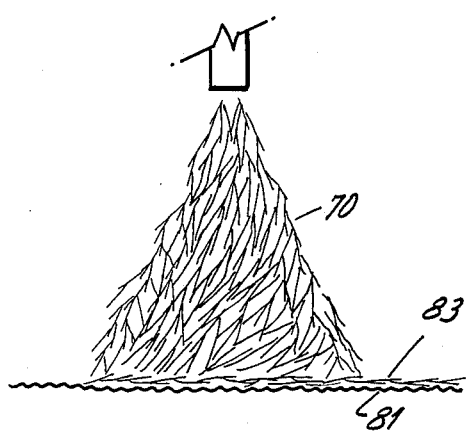
FIG. 14 is a schematic view illustrating a first step in carrying out the method of this invention.
Figure 15:
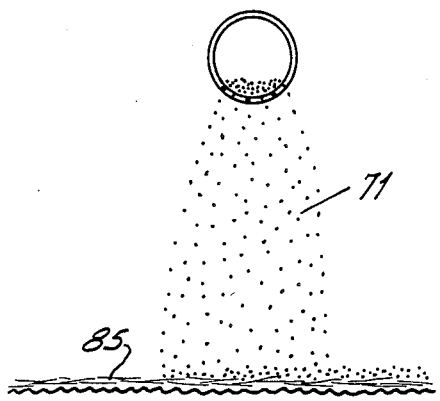
FIG. 15 is a view similar to FIG. 14, but illustrating a second step of the method.
Figure 16:
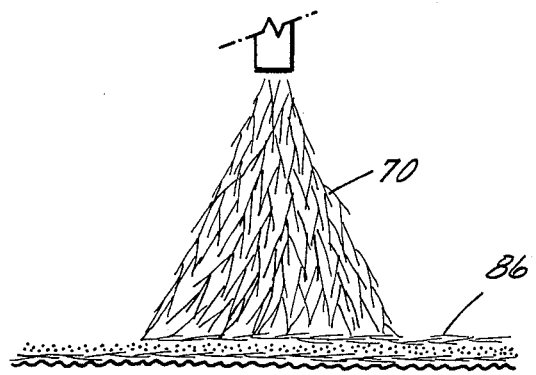
FIG. 16 is a view similar to FIGS. 14 and 15, but illusatrating a third step of the method.
Figure 17:
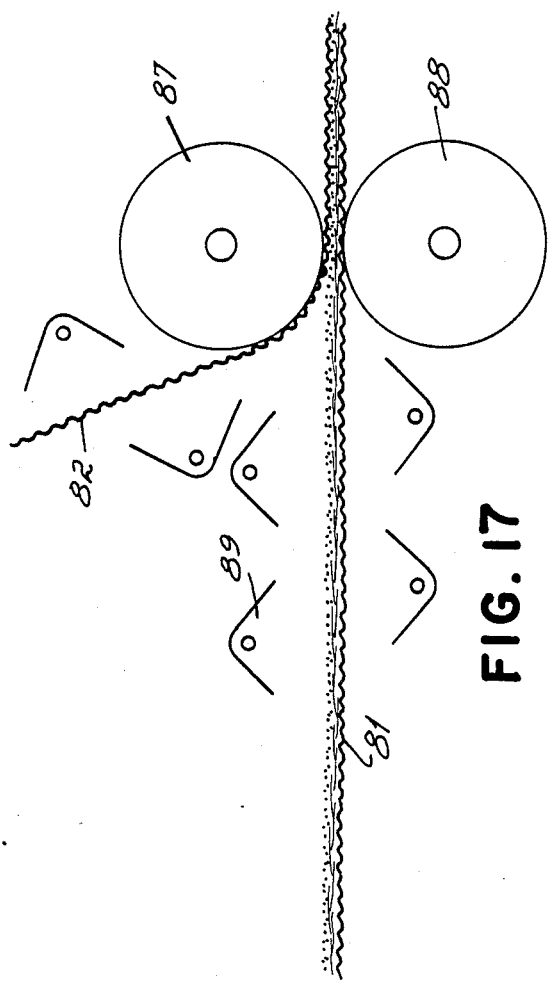
FIG. 17 is a schematic view illustrating a fourth step in carrying out the method of this invention.

The method for producing the moisture-absorbing cloths shown in FIGS. 5–7 is illustrated in FIGS. 14–17. First, the liquid hot melt adhesive/gas solution is discharged to form elongated strands 70 of foamed hot melt adhesive. The elongated strands 70 string together to form an open weave film 83 having a spider web like configuration on one surface of a first layer of a nonwoven cloth 81 as shown in FIG. 14. Then, a suitable amount of a hygroscopic agent is scattered in powder 71 form in the spaces 85 between the elongated strands 70 of the open weave film 83 but not so that the exposed surface of the elongated strands 70 of foamed adhesive is covered by the powdered hygroscopic agent particles, as shown in FIG. 15. Then more elongated strands 70 of hot melt adhesive foam are applied as described in the first step to form another open weave film 86 having a spider web like configuration as shown in FIG. 16. Finally, a second layer 82 of non-woven cloth is laid down onto the aforementioned composite, and the two layers 81, 82 of non-woven cloth are bonded together by the application of external pressure at ordinary temperature, or by the application of pressure and heat, if desired, as shown in FIG. 17. In this FIG. 17 method, the non-woven cloth substrate 82 is joined with the aforementioned composite at a pair of heated pinch rolls 87, 88 which heat and press the two layers 81, 82 of non-woven cloth together simultaneously, these pinch rolls being positioned downstream from heaters 89.

Figure 8:
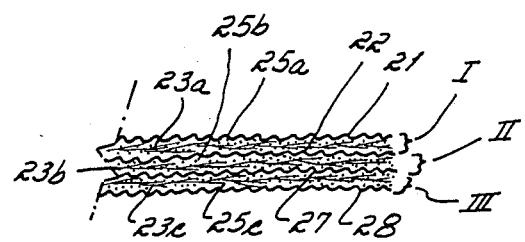
FIG. 8 is a cross section view of a second embodiment of a moisture-absorbing cloth in accord with the principles of the invention.
Figure 9:
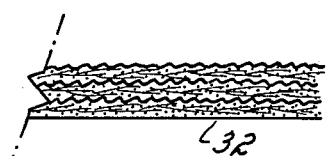
FIG. 9 is a cross section view of another example of a moisture-absorbing cloth similar to that shown in FIG. 8.

A second embodiment of a moisture-absorbing cloth is shown in FIGS. 8 and 9. In this second embodiment, three or more layers or substrates 21, 22, 27, 28 of non-woven cloth are bonded together by means of separate open weave films 23a, 23b, 23c which are obtained by spraying a hot melt adhesive foam so as to create the films having a spider web like configuration, as shown in FIG. 8. And as before, hygroscopic agent particles 25a, 25b, 25c are scattered in the open spaces between the elongated strands of the open weave films 23a, 23b, 23c. In short, several layers I, II and III of moisture-absorbing cloth, such as those obtained in producing the first embodiment shown in FIGS. 5 and 6, are stacked to form a multiple layer end product. In this embodiment, the larger the stack of layers I-III, the greater is the quantity of hygroscopic agent and the thicker is the overall end product. An alternative embodiment to the FIG. 8 product is shown in FIG. 9 where the outside layer 32 of the product is replaced by a layer of woven cloth or a sheet of plastic.

Figure 18:
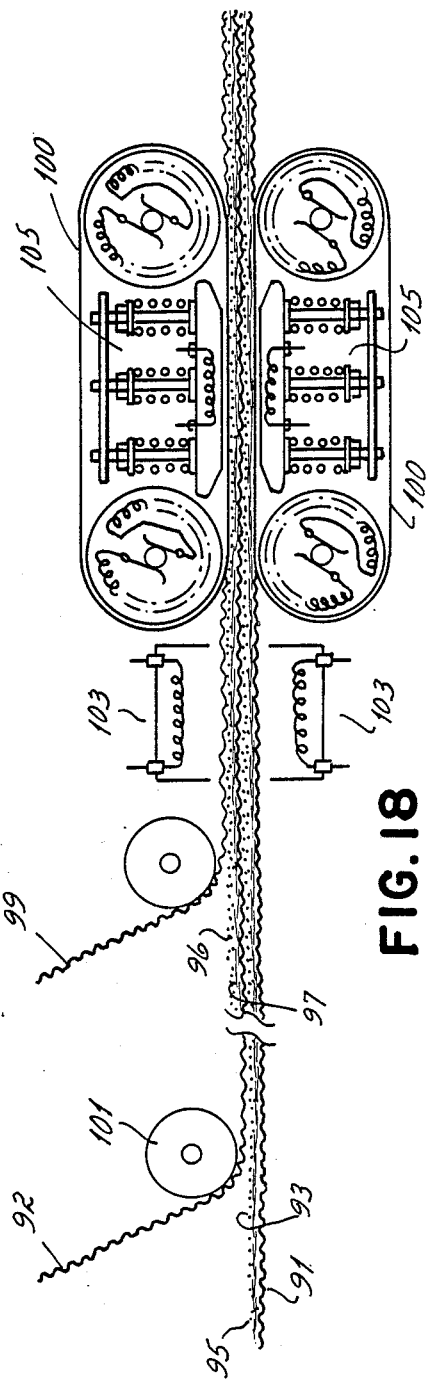
FIG. 18 is a view similar to FIG. 17, but illustrating an alternative fourth step.

The method for producing the moisture-absorbing cloth shown in FIGS. 8 and 9 is illustrated in FIGS. 14-16 and 18. The FIGS. 8 and 9 moisture-absorbing cloth is made by, in effect, stacking several layers of the product shown in FIGS. 5 and 6. Therefore, this method basically consists in a repetition of the method described above for the FIGS. 5 and 6 product with on exception. The exception is that the heating and pressing step should not be carried out for each new layer of the FIGS. 8 and 9 product, but rather all layers should be pressed together simultaneously after all the layers have been stacked so as to minimize thermal energy and labor. A continuous or endless steel belt system, as shown in FIG. 18, can be used for manufacture of this product. This FIG. 18 system includes web feed rolls 101, heater 103, and spring loaded pressure devices 105 that make use of endless belts 100. This machine handles non-woven cloth substrates 91, 92, 99, open weave foamed adhesive films 93, 97, and hygroscopic powders 95, 96 structured to interact in the manufacture of the FIGS. 8 and 9 product.

Figure 10:
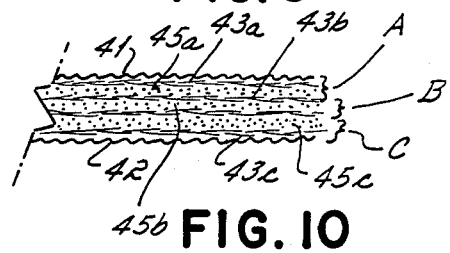
FIG. 10 is a cross section view of a third embodiment of a moisture-absorbing cloth in accord with the principles of the invention.
Figure 11:
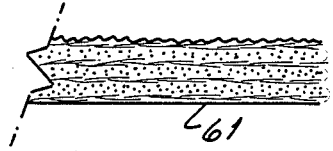
FIG. 11 is a cross section view of another example of a moisture-absorbing cloth similar to that shown in FIG. 10.

A third embodiment of a moisture-absorbing cloth is shown in FIGS. 10 and 11. In this embodiment, several layers 43a, 43b, 43c, each consisting of an open weave hot melt adhesive foam film having a spider web like configuration are stacked between the two layers 41, 42 of non-woven cloth, see FIG. 10. The hygroscopic agent particles 45a, 45b, 45c are scattered in the spaces between the fibers of the spider web structures of laminate layers A, B, and C, and between these layers. This product is characterized in that the open weave adhesive foam films 43a, 43c adhere strongly to each other. As in the case of the product shown in FIGS. 8 and 9, the quantity of hygroscopic agent increases with the number of layers. In the FIGS. 10 and 11 product, however, the increase in the thickness of the overall structure is not as great as in the case of the FIGS. 8 and 9 product. The reason for this is that there are not as many layers of non-woven cloth in the FIGS. 10 and 11 product as in the FIGS. 8 and 9 product. Furthermore, one of the two layers of non-woven cloth in the FIG. 8 product can be replaced by a layer of woven cloth or a sheet of plastic 61 as shown in FIG. 11.

The method for producing the moisture-absorbing cloth as shown in FIGS. 10 and 11 is similar to that used for producing the cloth shown in FIGS. 5 and 6. First, the hot melt adhesive foam is sprayed to form an open weave foamed adhesive film 43c on one side of a non-woven cloth substrate 42 in the manner shown in FIG. 14 in which a film 83 is deposited on substrate 81. Then a suitable amount of hygroscopic agent particles 45c is uniformly scattered in the spaces between the elongated strands of the open weave foamed adhesive film, in a manner similar to the scattering of particles 71 in FIG. 15. More hot melt adhesive foam is then sprayed to form another open weave film 43b, 86 corresponding to the film shown in FIG. 16. Upto this point, this method is the same as the method used for the FIGS. 5 and 6 product.

In the method for the FIGS. 10 and 11 product, however, more particles 45b are now scattered in the spaces between the elongated strands 43b of the open weave film, whereas with the method for the FIGS. 5 and 6 product another layer of non-woven cloth is laid down on top of the second open weave adhesive film layer. In the method for the FIGS. 10 and 11 product, the application of adhesive to form the open weave foamed adhesive films and the scattering of the active agent particles are repeated several times to form the product's multi-layers A, B, C. Finally, another layer of cloth 42 is laid down on the stack after a final open weave film has been applied so that the final product can be obtained by heating and pressing the entire composite. The methods used for heating and pressing may be the same as shown in FIG. 17 and described above.

Figure 12:
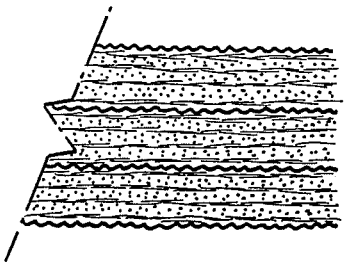
FIG. 12 is a cross section view of a fourth embodiment of a moisture-absorbing cloth in accord with the principles of the invention.
Figure 13:
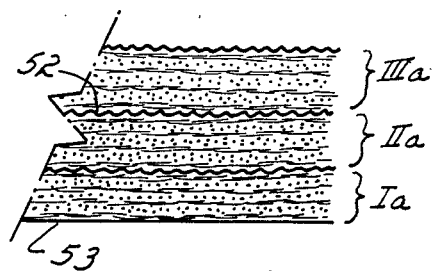
FIG. 13 is a cross section view of another example of a moisture-absorbing cloth similar to that shown in FIG. 12.

A fourth embodiment of a moisture-absorbing cloth is shown in FIGS. 12 and 13. In this fourth embodiment, several layers of the above-described product shown in FIG. 10 are stacked or laid up one on top the other. In other words, layer IIa is stacked on top of layer Ia, and both layers are of the FIG. 10 structure. If desired, layer IIIa can be stacked on top of layer IIa. In this case, however, only one sheet 52 of non-woven cloth is sandwiched between these layers. As shown in FIG. 13, one of the several sheets of non-woven cloth, or only the outside sheet, may be replaced by a layer of woven cloth or by a sheet of plastic 53.

The method for producing the moisture-absorbing cloth as shown in FIGS. 12 and 13 includes stacking layers of the product shown in FIGS. 10 and 11. Since this method consists merely in a repetition of that earlier described method, a detailed explanation can be omitted. Nevertheless, it should be pointed out that the process of heating and applying pressure should not be done each time a new layer is added, but rather all at once after all the layers have been stacked. This is to conserve thermal energy and labor.

The moisture-absorbing cloth of this invention may be used for bed sheets, for clothing such as underwear by combining it with other materials, for perspiration-absorbing fabrics such as linings for hats and insoles for shoes, and for many other purposes as well. As earlier noted, it is also possible to produce a deodorizing cloth by substituting a deodorizing agent such as activated charcoal for the hygroscopic agent. It is also possible to produce a fragrance-enhancing cloth by incorporating a scented powder. In these cases, it will be possible to make a variety of producing by combining various such agents between the layers of the final laminate product.

Having described in detail the preferred embodiment of my invention, what I desire to claim and protect by Letters Patent is:

1. A method of applying a foamable hot melt adhesive to a first substrate for adhering said first substrate to a second substrate, comprising:
    ejecting a foamable hot melt adhesive from the discharge orifice of a nozzle, and impacting said foamable hot melt adhesive ejected from said nozzle with heated air;
    controlling the flow rates of said foamable hot melt adhesive and said heated air, and controlling the temperature of said heated air, so as to form elongated strands of foamed hot melt adhesive;
    depositing said elongated strands of foamed hot melt adhesive onto said first substrate so that said elongated strands form an open weave film having a spider web like configuration; and
    thereafter bonding said second substrate to said first substrate.

2. The method of claim 1, said method comprising:
    ejecting pattern-shaping air from an air cap carried by said nozzle, and impacting said foamable hot melt adhesive ejected from said nozzle with the pattern-shaping air; and
    controlling the flow rate and temperature of said pattern-shaping air so as to form elongated strands of foamed hot melt adhesive.

3. A method as set forth in claim 1, said method comprising the step of:
    depositing an active agent within open spaces formed in said open weave film of elongated strands of foamed hot melt adhesive prior to bonding said second substrate to said first substrate.

4. A laminated product comprising:
    a first substrate;
    a foamable hot melt adhesive ejected from the discharge orifice of a nozzle at a controlled flow rate and impacted by a stream of atomizing air having a controlled temperature and a controlled flow rate to form elongated strands of foamed hot melt adhesive, said strands of foamed hot melt adhesive being applied to a surface of said first substrate in a film having a spider web like configuration when initially applied to said first substrate, the spider web like configuration defining open spaces between said elongated strands that cooperate to provide an open mesh hot melt adhesive foam film on said surface, and
    a second substrate bonded to said first substrate by said open mesh hot melt adhesive foam film.

5. A laminated product as set forth in claim 4, said product comprising:
    an active agent deposited within said open spaces defined by said open mesh hot melt adhesive foam film.

6. A laminated product as set forth in claim 5 in which said active agent is selected from the group consisting of a hygroscopic agent, a deodorizing agent, and a fragrance-enhancing agent.

7. A laminated product as set forth in claim 4, including means for varying the size of said spaces in said open meash hot melt adhesive foam film having a spider web like configuration.

8. A laminated product as set forth in claim 4 in which at least one of said first and second substrates has a non-woven fibrous surface.

9. A laminated product as set forth in claim 4 in which at least one of said first and second substrates is selected from the group consisting of a film and a foil.

* * * * *